US008339812B2

United States Patent
Martini et al.

(10) Patent No.: US 8,339,812 B2
(45) Date of Patent: Dec. 25, 2012

(54) RESONANT POWER CONVERTER WITH CURRENT DOUBLER RECTIFIER AND RELATED METHOD

(75) Inventors: Francesco Martini, Padua (IT); Paolo De Anna, Vallà di Riese Pio X (IT)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 151 days.

(21) Appl. No.: 12/746,195

(22) PCT Filed: Dec. 7, 2007

(86) PCT No.: PCT/IT2007/000856
§ 371 (c)(1), (2), (4) Date: Jun. 4, 2010

(87) PCT Pub. No.: WO2009/072155
PCT Pub. Date: Jun. 11, 2009

(65) Prior Publication Data
US 2010/0254163 A1 Oct. 7, 2010

(51) Int. Cl.
*H02M 3/22* (2006.01)
*H02M 3/335* (2006.01)
(52) U.S. Cl. .................... 363/21.02; 363/17
(58) Field of Classification Search ............ 363/21.02, 363/21.03, 21.04, 21.06, 16, 17, 132, 98
See application file for complete search history.

(56) References Cited

U.S. PATENT DOCUMENTS

| | | | | |
|---|---|---|---|---|
| 5,663,876 | A * | 9/1997 | Newton et al. | 363/126 |
| 5,907,223 | A * | 5/1999 | Gu et al. | 315/247 |
| 6,483,721 | B2 * | 11/2002 | Terashi | 363/17 |
| 6,535,407 | B1 * | 3/2003 | Zaitsu | 363/126 |
| 7,230,388 | B2 * | 6/2007 | Takeuchi | 315/194 |
| 7,746,671 | B2 * | 6/2010 | Radecker et al. | 363/21.03 |

FOREIGN PATENT DOCUMENTS

| | | |
|---|---|---|
| EP | 1120896 A2 | 8/2001 |
| WO | 2006038157 A2 | 4/2006 |

OTHER PUBLICATIONS

International Search Report of International application No. PCT/IT2007/000856 mailed Oct. 7, 2008.
Chen et al., "Design of Planar Intergrated Passive Module for Zero-Voltage-Switched Asymmetrical Half-Bridge PWM Converter", IEEE Transactions on Industry Applications, vol. 39, No. 6, Nov./Dec. 2003, pp. 1-8.
Huber et al, "1.8-MHz, 48-V Resonant VRM", Applied Poer Electronics Conference and Exposition 2005, Twentieth annual IEEE Austin, TX, USA, Mar. 6-10, 2005, vol. 1, pp. 1-7.
Kazimierczuk, "Synthesis of Phase-Modulated Resonant DC/AC Inverters and DC/DC Converters", IEE Proceedings-B, vol. 139, No. 4, Jul. 1, 1992, pp. 1-8.
Unified Analysis of Half-Bridge Converters with Current-Doubler Rectifier Jian Sun et al. Applied Power Electronics Conference and Exposition, 2001. APEC 2001. Sixteenth Annual IEEE pp. 514-520, vol. 1.
Power Electronic Circuit Tae-Ung Kim et al. published at www.naeha.com.kr on Jan. 21, 2005 pp. 281-290.
English translation of the titles and sub-titles of "Power Electronic Circuit".

* cited by examiner

*Primary Examiner* — Gary L Laxton
*Assistant Examiner* — Zekre Tsehaye

(57) ABSTRACT

A power converter is provided, which may include a transformer having primary and secondary windings; a primary side switching bridge arrangement including at least two switches switcheable at a switching frequency to drive the primary winding of said transformer, said primary side switching bridge arrangement including at least one decoupling capacitor; and a secondary side rectifying and filtering stage coupled to the secondary winding of said transformer, wherein said secondary side rectifying and filtering stage includes a current doubler with at least one inductor, wherein said at least one decoupling capacitor and said at least one inductor in said current doubler comprise a resonant tank circuit having a resonant frequency range encompassing said switching frequency, whereby said converter exhibits a gain defined by the position of said switching frequency within said resonant frequency range.

10 Claims, 6 Drawing Sheets

RESONANT POWER CONVERTER WITH CURRENT DOUBLER RECTIFIER AND RELATED METHOD

RELATED APPLICATIONS

The present application is a national stage entry according to 35 U.S.C. §371 of PCT application No.: PCT/IT2007/000856 filed on Dec. 7, 2007.

TECHNICAL FIELD

This disclosure relates to DC resonant power converters, and was developed with special attention paid to its possible use in providing DC resonant power converters capable of performing Zero Voltage Switching (ZVS) with reduced noise and smaller components.

However, reference to this envisaged field of application is not to be construed in a limiting sense of this disclosure.

BACKGROUND

One of the most efficient topologies in insulated AC/DC and DC/DC converters with low voltage output is the resonant insulated half-bridge (HB). The differences between a normal half-bridge stage and a resonant HB stage are well known in the literature. This also applies to the advantages associated with this latter solution, i.e. a higher efficiency and power density (due e.g. to zero-voltage-switching or ZVS operation of the switches, sinusoidal or quasi-sinusoidal waveforms and energy re-circulation after storing in the tank and releasing) and lower EMI (Electro Magnetic Interference) disturbance emissions.

A resonant insulated half-bridge may be made up of a HB insulated stage with the addition of a resonant tank, which leads to a configuration including:
 a primary side half-bridge branch with two switches and decoupling capacitors;
 an insulating transformer with e.g. a center-tap secondary winding; and
 a secondary side rectifying and filtering stage.

A resonant tank may be comprised of two or more inductive and/or capacitive components, connected in different combinations, leading to different kinds of parallel- or series-resonant structures. The presence of such a resonant structure leads to the gain of the converter being dependent on the switching frequency of the half-bridge. In the simplest embodiments, a resonant tank may include only two components (namely an inductor and a capacitor) and may give rise to either series- or parallel-resonance depending on the position of the insulating transformer with respect to the tank.

In operation, the switches may be driven by means of a square-wave with 50% duty-cycle and a dead-time to avoid cross-conduction in the switches and to reach ZVS condition. A Voltage Controlled Oscillator (VCO) may allow to control the output voltage of the converter by changing the switching frequency of the half-bridge.

Document EP-A-1 120 896 is generally representative of the prior art as considered herein.

A basic aim pursued in real applications may be to reduce the number and the dimensions of the components used and to increase inasmuch as possible the efficiency of the whole stage. Keeping EMI emissions as low as possible may be another desirable feature.

This may involve e.g. distributing the dissipated power homogenously over all the components and by integrating different functions in the same component.

In order to increase the efficiency of these typically low-voltage high-current converters, a current-doubler stage may be replaced for the output rectifying stage. This solution leads to a reduction in the current flowing in the secondary side of the transformer and to the elimination of the center tap in the transformer, which in turn leads to an increase in efficiency and a simplification and size decrease in the transformer, by the addition of a second output inductor.

A further attempt at reducing the number of the components may involve lowering the capacitive values of the HB capacitors, which permits to render them a part of the resonant tank, rather then using a third component. Another approach for decreasing the number of components involves using the parasitic parameters of the insulation transformer, such as the leakage or magnetizing inductance, as a part of the resonant tank, thus avoiding the use of an external inductor to provide series- or parallel-resonance.

SUMMARY

While those solutions considered in the foregoing may represent viable solutions, the Applicants have observed that the integration of different functions in the same component may lead to increasing the power dissipation in the component concerned, thus requiring an increase in the dimensions of the component. More to the point, integrating the resonant functions in the insulating transformer may turn out to be very critical. This may be i.a. because the transformer already exhibits considerable dimensions due to its importance in guaranteeing proper galvanic insulation between the primary and the secondary sides, especially in low voltage applications.

The object of the invention is thus to provide a solution which may dispense with the drawbacks of the prior art solutions considered in the foregoing.

According to the invention, that object is achieved by means of a converter having the features set forth in the claims that follow. The disclosure also relates to a corresponding method.

The claims are an integral part of the disclosure of the invention provided herein.

An embodiment of the arrangement disclosed herein is thus a resonant converter including a resonant tank comprised of one or more capacitors on the primary side (or both the primary and the secondary side) of the transformer and the inductors of a current-doubler output rectifying stage.

In an embodiment, resonance may be created between the decoupling capacitors of the bridge arrangement (half-bridge or full-bridge) on the primary side of the transformer and the inductor(s) of the current doubler on the secondary side.

In an embodiment, the operating frequency of the half bridge may be near the resonance frequency, which in turn depends on the values of the capacitors and on the values of the inductors multiplied by the impedance transfer ratio of the transformer.

In a typical embodiment, the parasitic magnetizing and leakage inductances of the transformer are not included in making up the resonant tank.

In fact these inductances are much higher and much lower, respectively, than the inductance values of the resonant coils as seen from the primary side.

In an embodiment, the resonant tank between the inductors of the current doubler and the decoupling capacitors produces a resonant frequency range, i.e. a family of bell-shaped gains, depending on the load of the converter which encompasses the switching frequency fsw.

The load of the converter defines the working condition Q and correspondingly the switching frequency fsw.

In an embodiment, in order to avoid that slight changes in the operating frequency of the half-bridge may result in changes in the output power, the output power may be controlled via a feedback signal and a VCO.

The main advantages related to the arrangement disclosed herein are:
- the number of components is limited since the resonant tank does not require specific components added for that purpose;
- the power losses are shared among the transformer and the inductors of the current doubler;
- the converter is of simple design and the insulating transformer can be reduced to small dimensions (no gap in the ferrite, single secondary winding) while also having no magnetizing current flowing and dissipating;
- the EMI emissions are low.

In practical applications, this leads to a reduction in the overall dimensions of the converter. This may also lead to a reduction in the complexity of the circuitry and of the PCB layout as well as to a reduction in terms of cost (smaller and simpler insulation transformer, no resonant inductor)

BRIEF DESCRIPTION OF THE DRAWINGS

Embodiments of the invention will now be described, by way of example only, with reference to the enclosed figures of drawing, wherein.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment may be included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
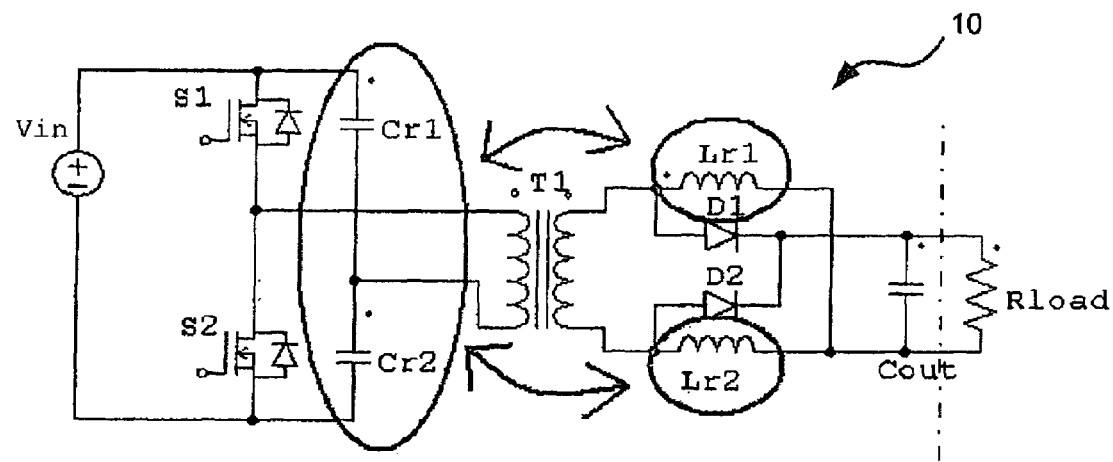
FIG. 1 is a block diagram of a converter as described herein.

In the block diagram of FIG. 1, reference 10 denotes as a whole a resonant insulated half-bridge (HB) converter including:
- a primary side half-bridge branch with two switches S1, S2 and decoupling capacitors Cr1, Cr2;
- an insulating transformer T1 having a primary winding connected across the intermediate points between the switches S1, S2 and the decoupling capacitors Cr1, Cr2 of the half-bridge arrangement; and
- a secondary side rectifying and filtering stage associated with the secondary winding of the transformer T1; the rectifying and filtering stage in question includes two rectifier diodes D1, D2 and a LC filter with two inductors Lr1, Lr2 and an output capacitor Cout. Such a rectifying and filtering stage provides current doubler operation.

As used herein, the terms "primary side" and "secondary side" are evidently related to the primary and secondary windings of the transformer.

While a half-bridge arrangement with two switches S1, S2 and decoupling capacitors Cr1, Cr2 is shown herein by way of example, it will be appreciated that the circuit topology of this disclosure can be extended i.a. to a full-bridge arrangement.

Irrespective of the nature of the bridge arrangement, the at least two switches S1, S2 included therein act on an input DC voltage Viri and are shown with their associated inverse diodes.

Rload represents the resistance value of an exemplary load (e.g. a LED cell including one or more Light Emitting Diodes or LEDs) driven by the converter 10. It will be appreciated that, while illustrated herein in order to facilitate understanding the description, such a load does not represent per se a part of the converter 10.

Figure 3:
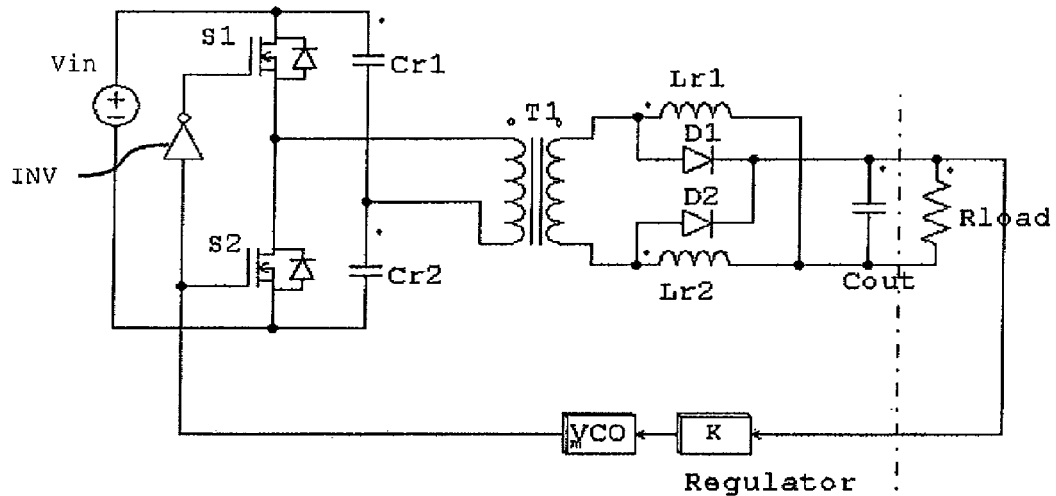
FIG. 3 is a block diagram of a converter as illustrated in FIG. 1 supplemented with a control structure.

The switches in the primary side switching arrangement such as the switches S1, S2 in the exemplary half-bridge arrangement in FIGS. 1 and 3 may be comprised of solid-state switches such as e.g. MOSFETs, BJTs. These switches may be driven by means of a square-wave with e.g. 50% duty-cycle and a dead-time to avoid cross-conduction in the switches and to reach ZVS condition.

As schematically shown by the double arrows in FIG. 1, an embodiment of the arrangement disclosed herein is a resonant converter including a "resonant tank" comprised of one or more capacitors on the primary side (or both the primary and the secondary side) of the transformer and the inductors of a current-doubler output rectifying stage.

In an embodiment, resonance in the tank may be created between the decoupling capacitors of the half-bridge on the primary side of the transformer (e.g. Cr1, Cr2) and the inductors (e.g. Lr1, Lr2) of the current doubler on the secondary side.

The condition of resonance thus created is related to the operating frequency of the half bridge. In an embodiment, the operating (i.e. switching) frequency fsw of the half bridge may be near the resonance frequency fr, which in turn depends on the values of the capacitors Cr1, Cr2 and on the values of the inductors Lr1, Lr2 multiplied by the impedance transfer ratio of the transformer.

In an embodiment, the parasitic magnetizing and leakage inductances of the transformer are not included in making up the resonant tank: in fact these inductances are much higher and much lower, respectively, than the inductance values of the resonant coils as seen from the primary side.

In an embodiment, the resonant tank between the inductors of the current doubler and the decoupling capacitors introduces a family of bell-shaped gains, depending on the load of the converter. The load of the converter defines the working condition Q and correspondingly the switching frequency fsw.

Exemplary values for Cr1, Cr2 may be 6,800 pF, while exemplary values for Lr1, Lr2 may be 40 microH. With an exemplary impedance transfer ratio (n2/n1) of the transformer T1 equal to 4.5, this results in a value for fr of about 48 kHz, while an exemplary value for fsw may be about 80 kHz.

Figure 2:
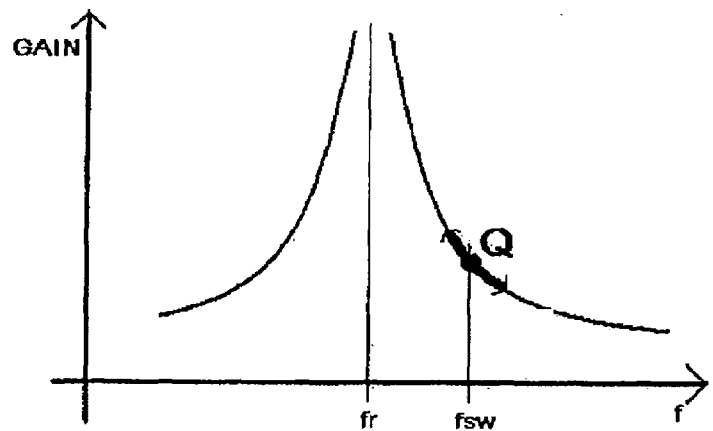
FIG. 2 is a graph representative of the gain of a converter as illustrated in FIG. 1.

The graph of FIG. 2 is an exemplary representation of the gain of the converter (ordinate scale) as a functions of frequency (abscissa scale). The graph exhibits the typical bell-like behavior of a resonant circuit centered at the resonance frequency fr with the operating/switching frequency fsw located within the resonance range of the resonance tank and selected in order to identify the desired working condition (i.e. the desired gain range) Q.

In an embodiment as shown in FIG. 3, in order to avoid that slight changes in the operating frequency fsw of the half-bridge may result in changes in the output power, the output power may be controlled via a feedback signal derived (in a known manner) from the load Rload and a VCO. The feedback signal is fed to a regulator with a gain K and on to a Voltage Controlled Oscillator or VCO that acts on the gates of the switches S1, S2 to produce alternate switching (on/off. A logic inverter INV is arranged between the gates of the switches S1, S2 in order to ensure the desired complementary switching, i.e. switch S1 turned on (resp. off) as switch S2 is switched off (resp. on) according to a ZVS (Vero Voltage Switching) pattern) with a proper dead-time between the two switch-on events.

Operation of the arrangement disclosed herein will now be described by referring to the equivalent models shown in FIGS. 4 to 6, which refer to the model of the converter 10 as seen from the primary side of the transformer T1.

Two different equivalent models may be defined depending on the conduction state of the output diodes. In each model one of the output inductors is in resonance and in series with the load, while the other is in parallel with the load.

The model for the transformer includes a primary leakage inductance Lleak1, a magnetizing inductance Lmag and a secondary leakage inductance Lleak2. The magnetizing inductance of the transformer is large in comparison with the others and may thus be neglected. In that way the leakage inductance of the secondary winding may be in series with the primary leakage inductance and they can be considered as an only component Lleak. As stated before, this inductor may be not a part of the resonance tank but may facilitate (together with the capacitors Cp1 and Cp2) the ZVS behavior of the switches S1 and S2.

Df1 and Df2 are freewheeling diodes, which may be part of the switches S1, S2 (in case of MOSFETs) or not. Cp1 and Cp2 may be parasitic capacitances of the switches, as well as external capacitors.

Figure 4:
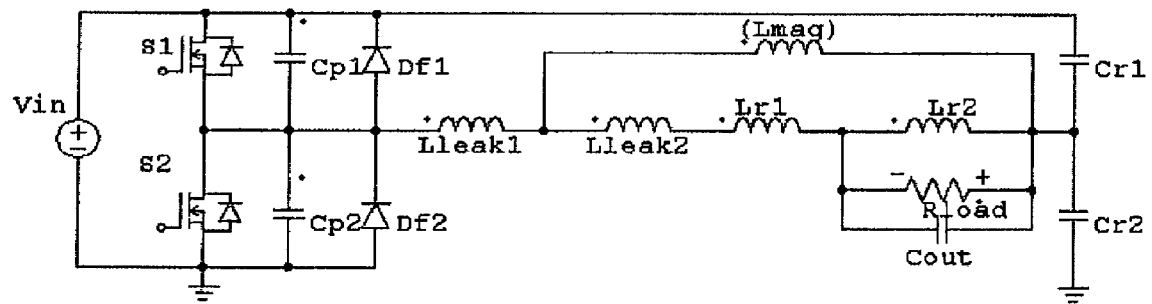
FIGS. 4 to 6 are representative of equivalent circuits for analysing operation of a converter as described herein.
Figure 5:
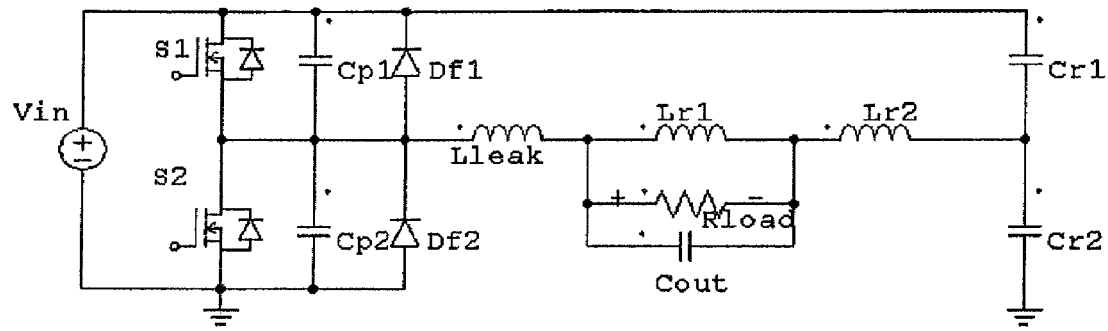
Figure 6:
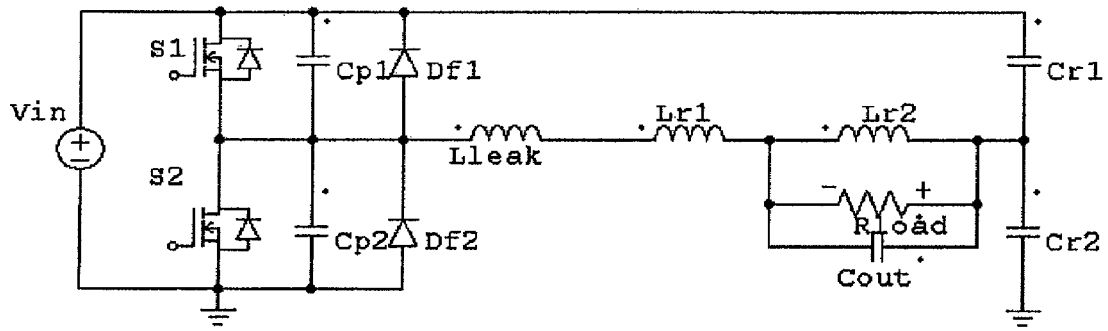

To sum up, FIG. 4 represents one of the two equivalent configurations (with Lleak1, Lleak2 and Lmag) while FIGS. 5 and 6 show both configurations of the equivalent circuits of the converter without Lmag.

By referring to the timings of the half-bridge (including the dead-times with the discharge phases of Cp1 and Cp2 and the freewheeling phases) and the direction of the current flowing in the inductors Lr1, Lr2 of the current doubler, cyclical operation of the converter 10 can be partitioned into ten different phases or intervals, bound by time instants T0 . . . T9. This partition is presented in the following table.

| | Gate S1 (Hi-mos) | Gate S2 (Low-mos) | I(MOS HI) | I(MOS LO) | MOS phase | I(Lr1) | L(Lr2) | I(L_leak) | Diode D2 | Diode D |
|---|---|---|---|---|---|---|---|---|---|---|
| T0-T1 | OFF | OFF | Neg | NONE | FW | Neg | Pos | Neg | ON | OFF |
| T1-T2 | ON | OFF | Neg | NONE | FW | Neg | Pos | Neg | ON | OFF |
| T2-T3 | ON | OFF | Pos | NONE | Dir | Neg | Neg | Pos | ON | OFF |
| T3-T4 | ON | OFF | Pos | NONE | Dir | Pos | Neg | Pos | ON | OFF |
| T4-T5 | OFF | OFF | Pos | Neg | C Par | Pos | Neg | Pos | OFF | ON |
| T5-T6 | OFF | OFF | NONE | Neg | FW | Pos | Neg | Pos | OFF | ON |
| T6-T7 | OFF | ON | NONE | Neg | FW | Pos | Neg | Pos | OFF | ON |
| T7-T8 | OFF | ON | NONE | Pos | Dir | Neg | Neg | Neg | OFF | ON |
| T8-T9 | OFF | ON | NONE | Pos | Dir | Neg | Pos | Neg | OFF | ON |
| T9-T0 | OFF | OFF | Neg | Pos | C Par | Neg | Pos | Neg | ON | OFF |

Figure 7:
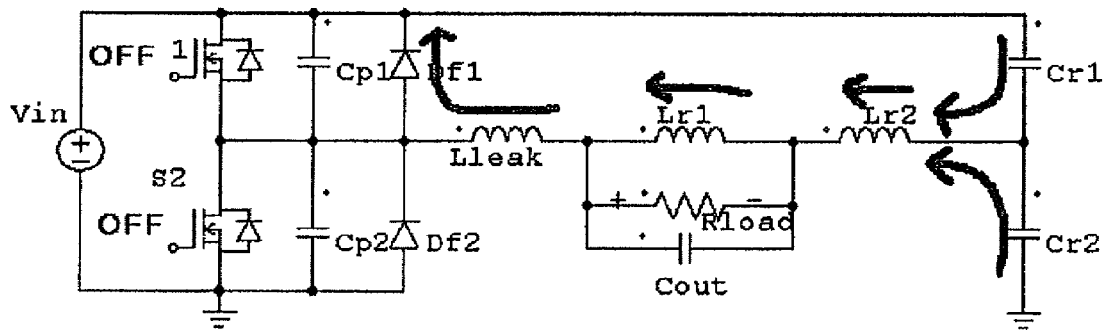
FIGS. 7 to 16 are block diagrams in support of a description of operation of a converter as described herein.

Where:
Neg = Negative
Pos = Positive
FW = Freewheeling
Dir = Direct
C Par = C parasitic T0-T1 (FIG. 7):
In this phase, both the switches are OFF (dead-time), the voltage of the half-bridge is high and the current may be flowing from the transformer through the freewheeling diode of the high mosfet.

Figure 8:
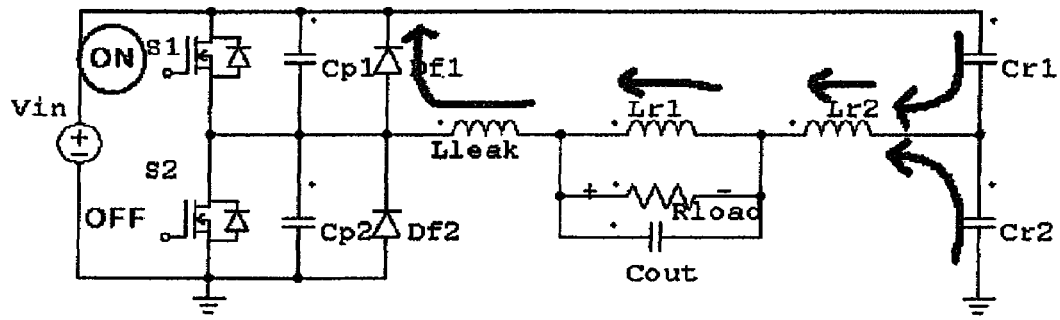

T1-T2 (FIG. 8):
The high mos is switched on. The current keeps on flowing throught the freewheeling diode. This is a ZVS condition. No changes occur in the output inductors.

Figure 9:
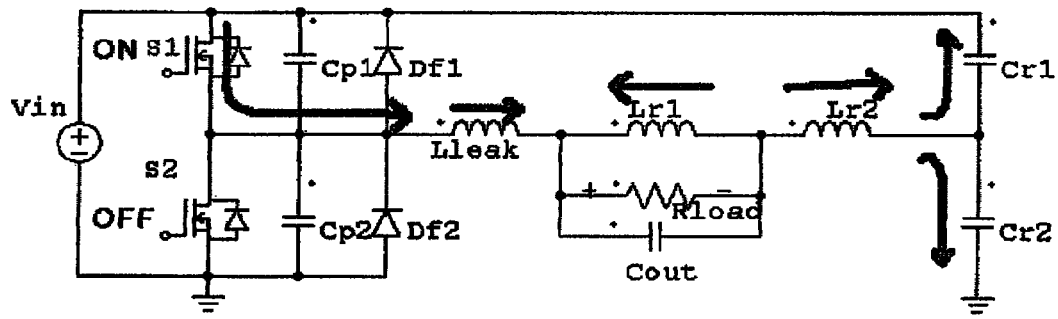

T2-T3 (FIG. 9):
The currents both in the switch and in the transformer changes direction. The high mos is in direct conduction and the current starts flowing in the opposite direction through the transformer, the series inductor Lr2 and the decoupling capacitors Cr1, Cr2. The direction of the current in Lr1 does not change.

Figure 10:
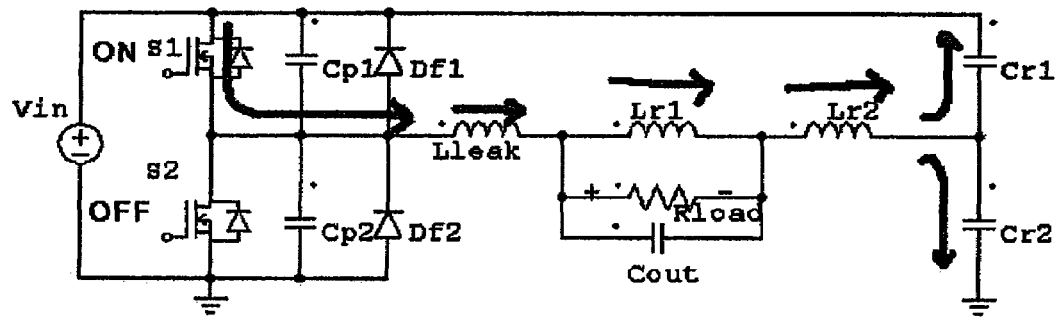

T3-T4 (FIG. 10):
The current in the parallel inductor Lr1 changes direction.

Figure 11:
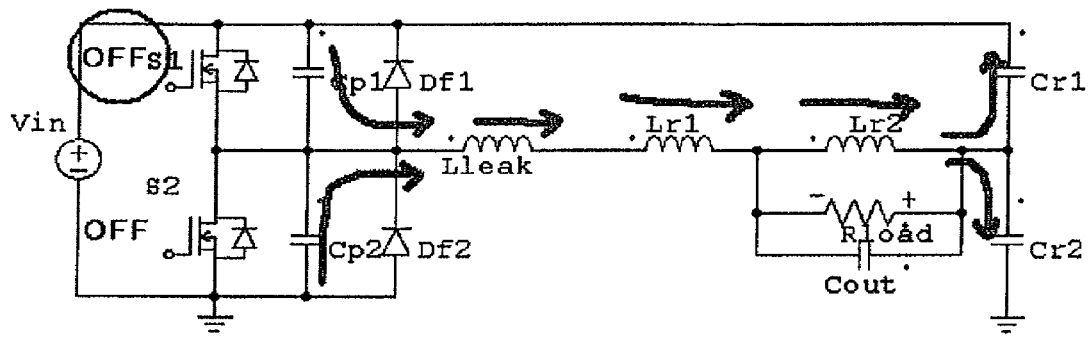

T4-T5 (FIG. 11):
The high mos switches off. The current keeps on flowing positive in the transformer by discharging the parasitic capacitors Cp1, Cp2 of the switches. The voltage of the HB decreases to zero towards a ZVS condition. The output inductors exchange their roles due to one diode switching off as the other switches on. The equivalent model changes: Lr1 is the new series-inductor and Lr2 is the new parallel-inductor.

Figure 12:
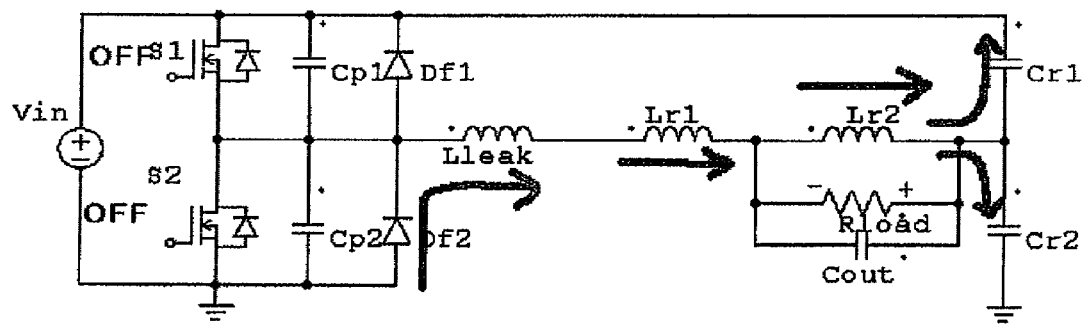

T5-T6 (FIG. 12):
The current starts flowing through the freewheeling diodes of the low switch. No other changes occur.

Figure 13:
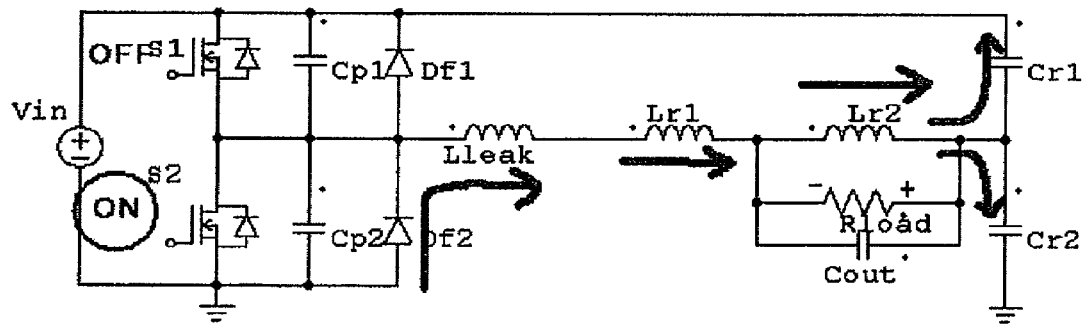
Figure 14:
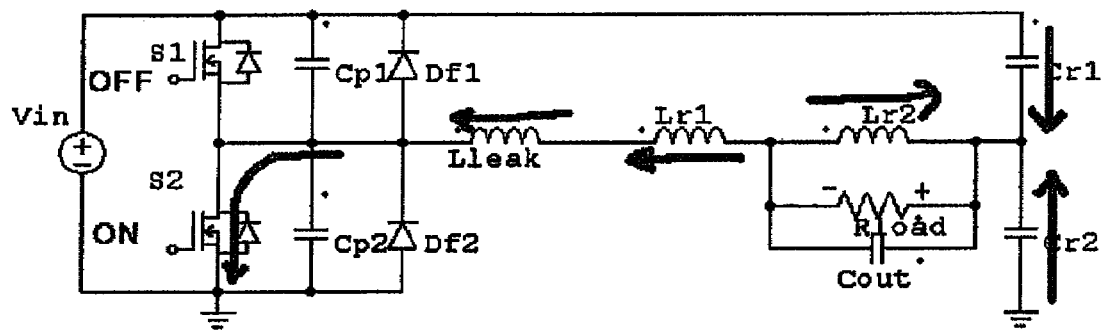
Figure 15:
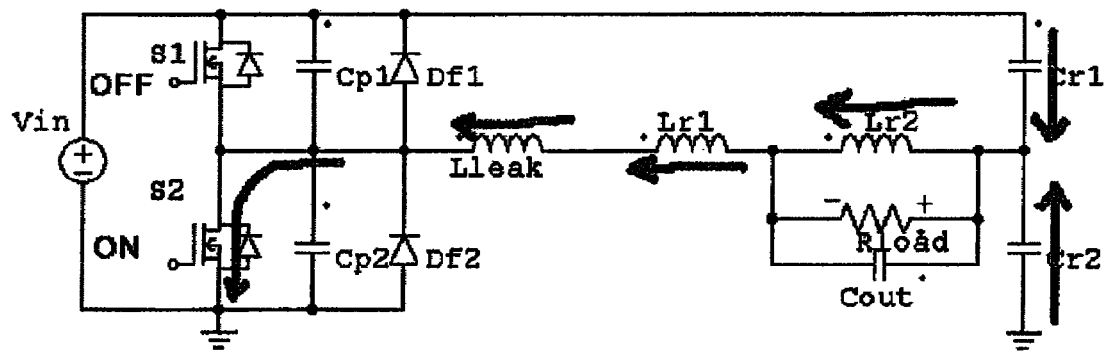
Figure 16:
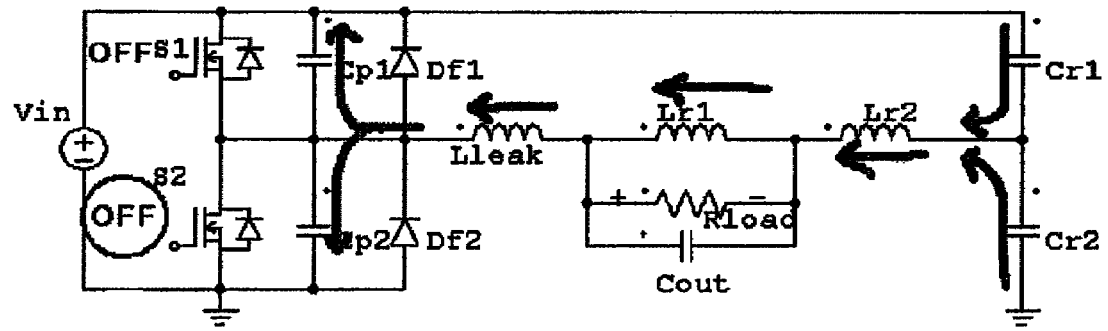

T6-T7 (FIG. 13):
The low mos is switched on. The current keeps on flowing negative through the freewheeling diode. This is a ZVS condition. No changes occur in the output inductors.

T7-T8 (FIG. 14):

The current in the switch and in the transformer changes direction, flowing negative. The low mos is in direct conduction and the current reverses also in the series-inductor Lr1 and in the decoupling capacitors Cr1, Cr2. The direction of the current in Lr2 does not change.

T8-T9 (FIG. 15):

The current in the parallel-inductor Lr2 changes direction.

T9-T0 (FIG. 16):

The low mos switches off. The current keeps on flowing negative through the transformer and the parasitic capacitors of the mosfets Cp1, Cp2. The voltage of the HB increases to Vin approaching a ZVS condition. The two output diodes exchange their roles so that the equivalent model of the output stage changes again. The series-inductor may be again Lr2 and the parallel-inductor is Lr1. Operation returns to T0.

The circuitry of this disclosure has been tested in various arrangements including i.a. a converter with 24V output voltage and 50 W output power and a converter with 10V output voltage and 150 W output power, with synchronous rectification.

Those of skill in the art will appreciate that the circuit topology of this disclosure can be implemented with other kinds of active switches on the primary side of the transformer and other configurations of rectifying device on the secondary side, including synchronous rectifiers, however driven, and/or other configurations of current doubler, possibly including i.a. current doubler configurations wherein the two exemplary inductors illustrated herein are incorporated to a single component. Also, the secondary side rectifying and filtering stage may include switching means providing synchronous rectification.

Similarly, the circuit topology of this disclosure can be implemented with a single decoupling capacitor connected to ground, to Vin or between the half-bridge and the transformer. One or more capacitors can be arranged in series with the secondary side of the transformer, wherein such additional capacitors may be or not be a part of the resonant tank.

Advantageously, the circuit topology of this disclosure may include small capacitors in parallel to the switches in order to improve ZVS performance or EMI behaviour and/or small capacitors arranged in parallel to the rectifying devices (i.e. the output diodes D1, D2) in order to change their voltage slope and voltage peak at the turning off.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A resonant power converter, comprising:
a transformer having primary and secondary windings;
a primary side switching bridge arrangement including at least two switches switchable at a switching frequency to drive the primary winding of said transformer, said primary side switching bridge arrangement including at least one decoupling capacitor; and
a secondary side rectifying and filtering stage coupled to the secondary winding of said transformer,
wherein said secondary side rectifying and filtering stage includes a current doubler with at least one inductor,
wherein said at least one decoupling capacitor and said at least one inductor in said current doubler comprise a resonant tank circuit having a resonant frequency range encompassing said switching frequency, whereby parasitic magnetizing and leakage inductances of said transformer are higher and lower, respectively, than an inductance values of said at least one inductor in said current doubler as seen from the primary winding and said converter exhibits a gain defined by a position of said switching frequency within said resonant frequency range.

2. The converter of claim 1, wherein said at least one decoupling capacitor is connected to ground, to a input voltage of the converter or between said primary side switching bridge arrangement and said transformer.

3. The converter of claim 1, wherein said primary side switching bridge arrangement is a half-bridge arrangement.

4. The converter of claim 1, wherein said primary side switching bridge arrangement includes two decoupling capacitors.

5. The converter of claim 4, wherein said resonant tank circuit is comprised of said two decoupling capacitors in said primary side switching bridge arrangement and two inductors in said current doubler in said secondary side rectifying and filtering stage.

6. The converter of claim 1, further comprising: capacitances coupled to said switches to improve at least one of ZVS performance and EMI behaviour.

7. The converter of claim 1, wherein said secondary side rectifying and filtering stage includes output diodes, as well as capacitors in parallel with said output diodes.

8. The converter of claim 1, wherein said secondary side rectifying and filtering stage includes switching means providing synchronous rectification.

9. The converter of claim 1, further comprising: feedback circuitry sensitive to changes in a load driven by the converter; and switching drive means coupled to said feedback circuitry to control the switching frequency of said switches to vary the position of said switching frequency within said resonant frequency range to thereby adjust the gain of said converter and maintain an output power level of the converter irrespective of said changes in the load driven by the converter.

10. A method of operating a resonant power converter, the power converter comprising:
a transformer having primary and secondary windings;
a primary side switching bridge arrangement including at least two switches switcheable at a switching frequency to drive the primary winding of said transformer, said primary side switching bridge arrangement including at least one decoupling capacitor; and
a secondary side rectifying and filtering stage coupled to the secondary winding of said transformer, wherein said secondary side rectifying and filtering stage includes a current doubler with at least one inductor,
the method comprising:
selecting said at least one decoupling capacitor and said at least one inductor in said current doubler to comprise a resonant tank circuit having a resonant frequency range encompassing said switching frequency, and
selecting the gain of said converter by selecting a position of said switching frequency within said resonant frequency range.

* * * * *